United States Patent
Nakagi et al.

(10) Patent No.: US 11,891,783 B2
(45) Date of Patent: Feb. 6, 2024

(54) CALIBRATION WORK SUPPORT SYSTEM

(71) Applicant: HITACHI CONSTRUCTION MACHINERY CO., LTD., Tokyo (JP)

(72) Inventors: Kenta Nakagi, Tsukuba (JP); Yasuhiko Kanari, Kasumigaura (JP); Shiho Izumi, Hitachinaka (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 506 days.

(21) Appl. No.: 17/274,828

(22) PCT Filed: Jan. 29, 2020

(86) PCT No.: PCT/JP2020/003229
§ 371 (c)(1),
(2) Date: Mar. 10, 2021

(87) PCT Pub. No.: WO2020/195135
PCT Pub. Date: Oct. 1, 2020

(65) Prior Publication Data
US 2022/0018098 A1   Jan. 20, 2022

(30) Foreign Application Priority Data
Mar. 26, 2019   (JP) .................. 2019-059267

(51) Int. Cl.
*E02F 9/26* (2006.01)
*G06T 7/80* (2017.01)
(Continued)

(52) U.S. Cl.
CPC .......... *E02F 9/264* (2013.01); *G02B 27/0093* (2013.01); *G02B 27/0101* (2013.01);
(Continued)

(58) Field of Classification Search
CPC ........ E02F 9/264; E02F 9/26; G02B 27/0093; G02B 27/0101; G02B 27/017;
(Continued)

(56) References Cited

U.S. PATENT DOCUMENTS

| | | |
|---|---|---|
| 2009/0262113 A1 | 10/2009 | Kotake et al. |
| 2014/0104437 A1 | 4/2014 | Chao et al. |

(Continued)

FOREIGN PATENT DOCUMENTS

| | | |
|---|---|---|
| JP | 2011-001775 A | 1/2011 |
| JP | 5111210 B2 | 1/2013 |

(Continued)

OTHER PUBLICATIONS

Beppu, et al., "Tele Operted Hydraulie Excavator with environment", Bulletin of Computational Science Research Center, vol. 18, 2005, Hosei University. https://www.media.hosei.ac.jp/bulletin_archives/vol118_06.pdf.

(Continued)

*Primary Examiner* — Alan D Hutchinson
(74) *Attorney, Agent, or Firm* — Mattingly & Malur, PC

(57) ABSTRACT

A calibration work support system includes an input device for inputting machine information including machine rank data on a hydraulic excavator and specification data on a front work implement, a display controller that generates a target posture image that is an image of the case in which the front work implement that takes target measurement posture is viewed with a point-of-view position and a line-of-sight direction of an operator M on the basis of the machine information input from the input device and target posture data defined in advance as the target measurement posture of the front work implement when an inertial measurement device is calibrated, and an HMD that displays the target posture image generated in the display controller. The HMD (Continued)

US 11,891,783 B2

Page 2 executes displaying in such a manner that the target posture image is superimposed on the actual front work implement viewed with the point-of-view position and the line-of-sight direction of the operator M.

4 Claims, 15 Drawing Sheets

(51) Int. Cl.
G06T 7/70 (2017.01)
G02B 27/00 (2006.01)
G02B 27/01 (2006.01)

(52) U.S. Cl.
CPC ....... *G02B 27/017* (2013.01); *G02B 27/0179* (2013.01); *G06T 7/70* (2017.01); *G06T 7/80* (2017.01); G02B 2027/014 (2013.01); G02B 2027/0138 (2013.01); G02B 2027/0187 (2013.01); G06T 2207/30204 (2013.01); G06T 2207/30252 (2013.01)

(58) Field of Classification Search
CPC ........ G02B 27/0179; G02B 2027/0138; G02B 2027/014; G02B 2027/0187; G06T 7/70; G06T 7/80; G06T 2207/30204; G06T 2207/30252; G06T 2200/24; G06T 7/75; G01B 11/00; G01C 15/00; G01P 21/00; G06F 3/0484
See application file for complete search history.

(56) References Cited

U.S. PATENT DOCUMENTS

2014/0188333 A1 7/2014 Friend
2018/0171598 A1 6/2018 Iwamura et al.
2019/0003155 A1 1/2019 Kurogi et al.

FOREIGN PATENT DOCUMENTS

| JP | 2016-061054 A | 4/2016 |
| JP | 2016-154009 A | 8/2016 |
| KR | 10-2017-0139101 A | 12/2017 |
| WO | 2014/167731 A1 | 10/2014 |

OTHER PUBLICATIONS

International Search Report of PCT/JP2020/003229 dated Mar. 24, 2020.
Extended European Search Report received in corresponding European Application No. 20777303.7 dated Nov. 30, 2022.
Translation of the International Preliminary Report on Patentability received in corresponding International Application No. PCT/JP2020/003229 dated Oct. 7, 2021.
Korean Office Action Received in corresponding Korean Application No. 10-2021-7005363 dated Aug. 9, 2022.

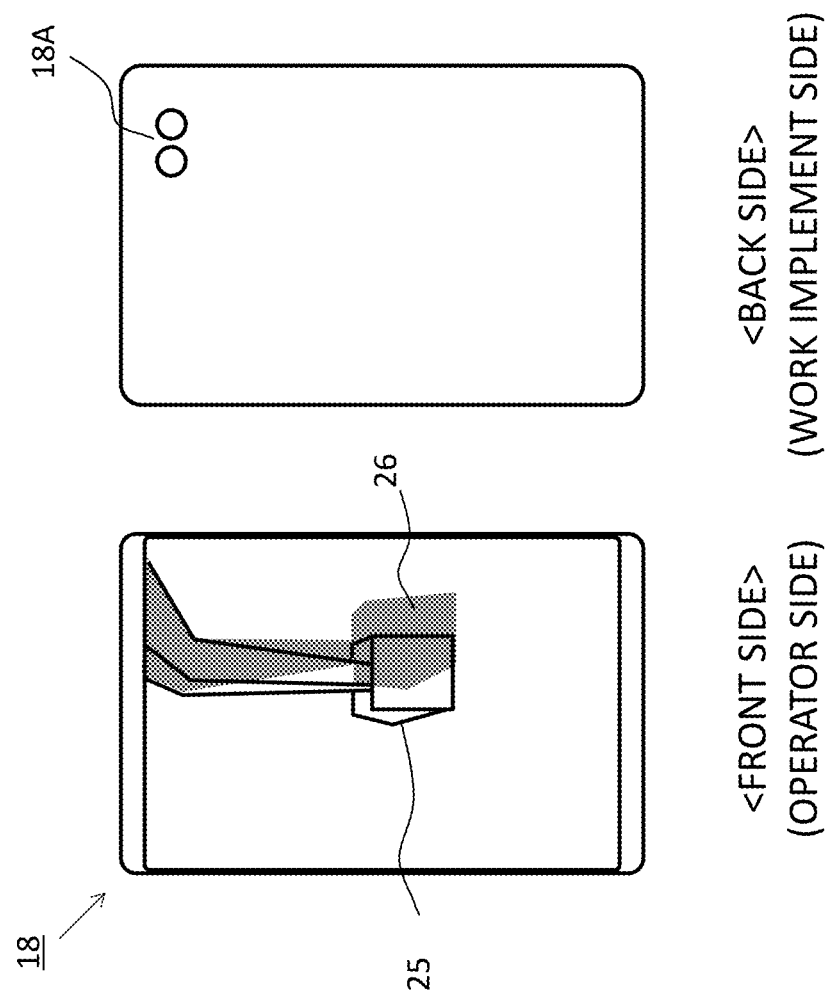

CALIBRATION WORK SUPPORT SYSTEM

TECHNICAL FIELD

The present invention relates to a calibration work support system that supports calibration work of an inertial measurement device attached to a work device included in a work machine.

BACKGROUND ART

A hydraulic excavator is a typical work machine and includes an articulated front work implement as a work device. There is the machine guidance as a display system that presents the posture of the front work implement to an operator to support excavation work by the hydraulic excavator. The posture of the front work implement needs to be accurately detected for implementation of accurate machine guidance.

As a technique relating to position detection of the front work implement, a stroke initial calibration work support device for hydraulic cylinders is disclosed in Patent document 1. The stroke initial calibration work support device includes stroke sensors that measure the stroke length of the hydraulic cylinder, reset sensors that measure a reset reference point at which a measurement value of the stroke length by the stroke sensor is reset, and a stroke end detection processing section that detects the stroke end position of the hydraulic cylinder. The stroke initial calibration work support device includes also a calibration processing section that calibrates the measurement value of the stroke length when the reset reference point and/or the stroke end position is detected, a monitor that displays the whole of a work machine equipped with the hydraulic cylinders when initial calibration work of the hydraulic cylinder is executed, and a highlighting processing section that highlights a movable part for driving the hydraulic cylinder of a calibration subject and displays the driving direction.

PRIOR ART DOCUMENT

Patent Document

Patent Document 1: WO2014/167731

SUMMARY OF THE INVENTION

Problem to be Solved by the Invention

In recent years, an IMU (Inertial Measurement Unit) has been used as posture measurement means of a front work implement in the machine guidance. The IMU is an inertial measurement device composed of a gyro sensor and an acceleration sensor and posture measurement with high accuracy and high response is implemented by combining the two kinds of sensors. The IMUs are set on the surfaces of the machine body of a hydraulic excavator and the respective parts (boom, arm, bucket, and so forth) of a front work implement and the posture of the front work implement is measured by calibrating the attachment position and the attachment angle of the IMUs in advance. That is, when calibration work has not yet been executed, it is impossible to present posture data on the front work implement to an operator.

Here, the calibration work of the IMU is work of making matching between measurement values measured by the IMUs attached to the respective parts of the front work implement and the actual posture of the front work implement. Specifically, the front work implement is stopped with certain posture (target measurement posture) and measurement values of the IMUs at the time and the position coordinates of pivot parts (boom pin, arm pin, bucket link pin, and so forth) of the respective parts are measured by high-accuracy surveying equipment such as a total station, and a machine guidance controller is made to learn the two measurement values. At this time, in order to improve the accuracy of the calibration work, the learning of the measurement values is executed with plural postures. Furthermore, in order to suppress variation in the accuracy for each mass-produced machine, the measurement posture and the number of times of measurement in the calibration work are prescribed by a work procedure manual or the like.

However, machine ranks and specifications of the machine body are highly diversified. Therefore, it is difficult for an operator who operates the front work implement in a cab to operate the front work implement into specific posture. That it is difficult to grasp the posture of the front work implement from the point of view of the operator (appearance of the front work implement from the viewpoint of the cab) is obvious also from the fact that posture data on the front work implement is presented by using various points of view in the machine guidance. For this reason, conventionally, direct visual contact with the posture of the front work implement is made from the outside of the cab and whether the posture is correct posture is checked. Thus, extra work of checking the posture from the outside of the cab, which does not have a direct relation with the calibration work, occurs and therefore the work efficiency lowers.

In the above-described Patent document 1, operation support information that relates to calibration work of the stroke sensor of a cylinder built-in type is presented. Specifically, a part to be operated (movable part) and its direction (driving direction) are presented and operation of a stroke is detected by a sensor set at the stroke end of the cylinder, and completion of the calibration work is informed. In the case of using the stroke sensor, using the invention of Patent document 1 makes it possible to efficiently execute the calibration work even when the operator is not an expert.

However, in the case of using the IMU as the posture measurement means of the front work implement, it is impossible to use the technique of Patent document 1, in which the stroke sensor is used as the posture measurement means. This is because the stroke sensor of Patent document 1 is incorporated in the cylinder and therefore the attachment posture of the sensor is decided in advance whereas the attachment posture is unclear regarding the IMU and therefore the attachment posture needs to be calibrated in calibration work. For this reason, it is impossible to detect the stroke end of the cylinder and determine the completion of the calibration work as in Patent document 1. Furthermore, in the calibration work of the IMU, several measurement postures need to be taken and, with the support information (movable part and its driving direction) of Patent document 1, it is impossible for the operator to determine whether the front work implement is in correct measurement posture.

An object of the present invention is to provide a calibration work support system that allows an operator who operates a work machine in a cab to easily determine whether or not the posture of a work device in calibration work of an IMU corresponds with target measurement posture.

Means for Solving the Problem

The present application includes plural means for solving the above-described problem. To cite one example thereof, there is provided a calibration work support system that supports calibration work of an inertial measurement device attached to a work device included in a work machine. The calibration work support system includes an input device for inputting machine information including machine rank data on the work machine and specification data on the work device, a controller configured to generate a target posture image that is an image of a case in which the work device that takes target measurement posture is viewed from a predetermined point-of-view position in a predetermined line-of-sight direction on the basis of the machine information input from the input device and target posture data defined in advance as the target measurement posture of the work device when the inertial measurement device is calibrated, and a display device that displays the target posture image generated in the controller. The display device is configured to be capable of superimposing the target posture image on the work device that is actual and is viewed from the predetermined point-of-view position in the predetermined line-of-sight direction.

Advantages of the Invention

According to the present invention, posture check work by visual contact in calibration work of an IMU is omitted and therefore the efficiency of the calibration work can be improved.

BRIEF DESCRIPTION OF THE DRAWINGS

FIG. 15 is a diagram illustrating one example of a support image presented to the operator by a calibration work support system according to the modification example of the embodiment of the present invention.

MODES FOR CARRYING OUT THE INVENTION

An embodiment of the present invention will be described below by using the drawings.

In the following, as a work machine, a hydraulic excavator including a bucket as work equipment (attachment) at the tip of a work device will be exemplified. However, the present invention may be applied to a work machine including an attachment other than the bucket. Furthermore, application to a work machine other than the hydraulic excavator is also possible as long as it is a work machine including a work device for which an IMU can be used for posture detection.

(Overall Configuration)

Figure 1:
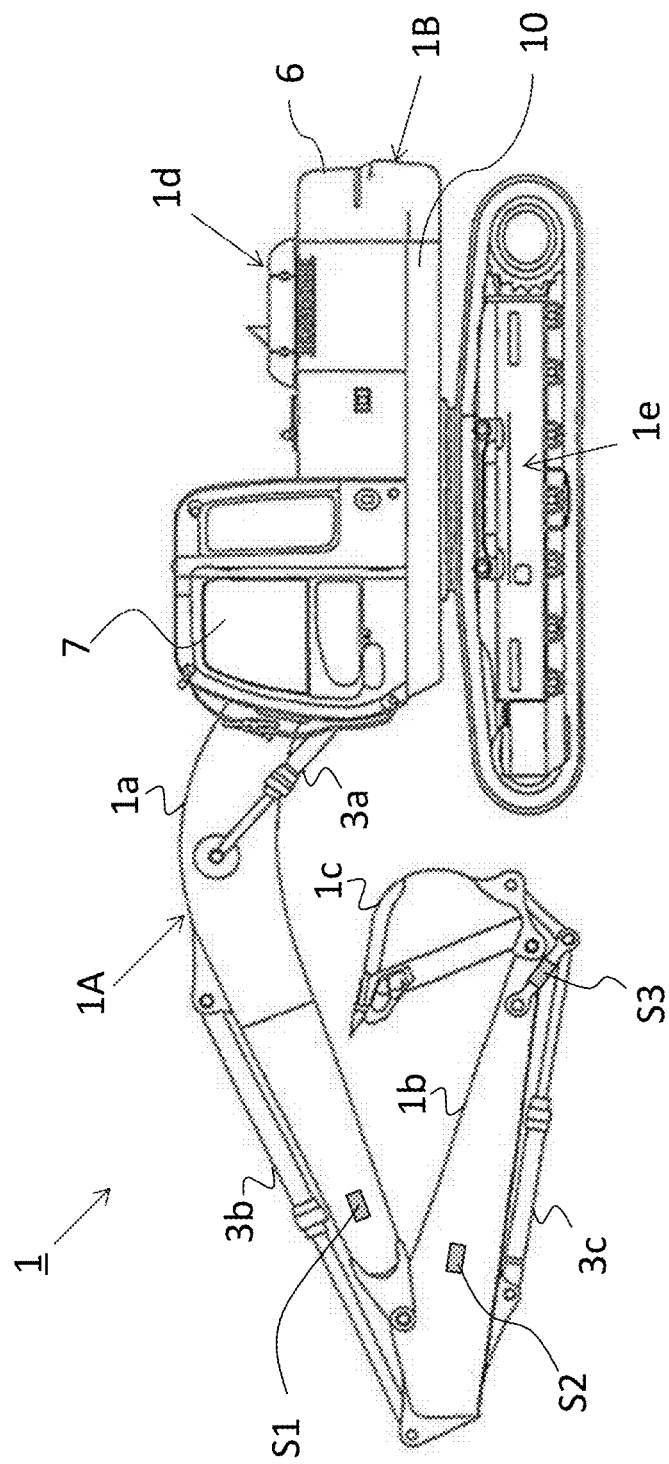
FIG. 1 is a configuration diagram of a hydraulic excavator according to an embodiment of the present invention.

FIG. 1 is a side view of a hydraulic excavator according to the embodiment of the present invention. The left and the right in the diagram will be often referred to as the front and the rear, respectively. The direction from the near side of the plane of paper toward the far side and the direction from the far side toward the near side will be often referred to as the right and the left, respectively. As illustrated in this diagram, a hydraulic excavator (work machine) 1 includes a lower track structure 1e and an upper swing structure 1B swingably attached to the upper side of this lower track structure 1e.

The upper swing structure 1B includes a swing frame 10 that serves as a base, a cab 7 disposed on the front left side of this swing frame 10, a front work implement (work device) 1A attached to the center of the front side of the swing frame 10 pivotally in the upward-downward direction, a counterweight 6 disposed on the rear side of the swing frame 10, and an engine room 1d installed between the front work implement 1A and the counterweight 6.

The front work implement (work device) 1A is configured by joining plural front members (boom 1a, arm 1b, and bucket 1c) that each pivot in the perpendicular direction. The base end of the boom 1a is pivotally supported at the front part of the upper swing structure 1B with the intermediary of a boom pin. The base end of the arm 1b is pivotally joined to the tip of the boom 1a with the intermediary of an arm pin. The base end of the bucket 1c is pivotally joined to the tip of the arm 1b with the intermediary of a bucket pin. The boom 1a is driven by a boom cylinder 3a. The arm 1b is driven by an arm cylinder 3b. The bucket 1c is driven by a bucket cylinder 3c.

This front work implement 1A is operated by an operator M who rides in the cab 7. The counterweight 6 is what is for keeping weight balance with the front work implement 1A and can be formed of a heavy object having a substantially circular arc horizontal section, for example.

Furthermore, to side surfaces of the respective front members (boom 1a, arm 1b, bucket 1c) of the front work implement 1A, inertial measurement devices (IMUs) S1 to S3 as posture measurement devices for measuring the respective postures are attached.

Figure 2:
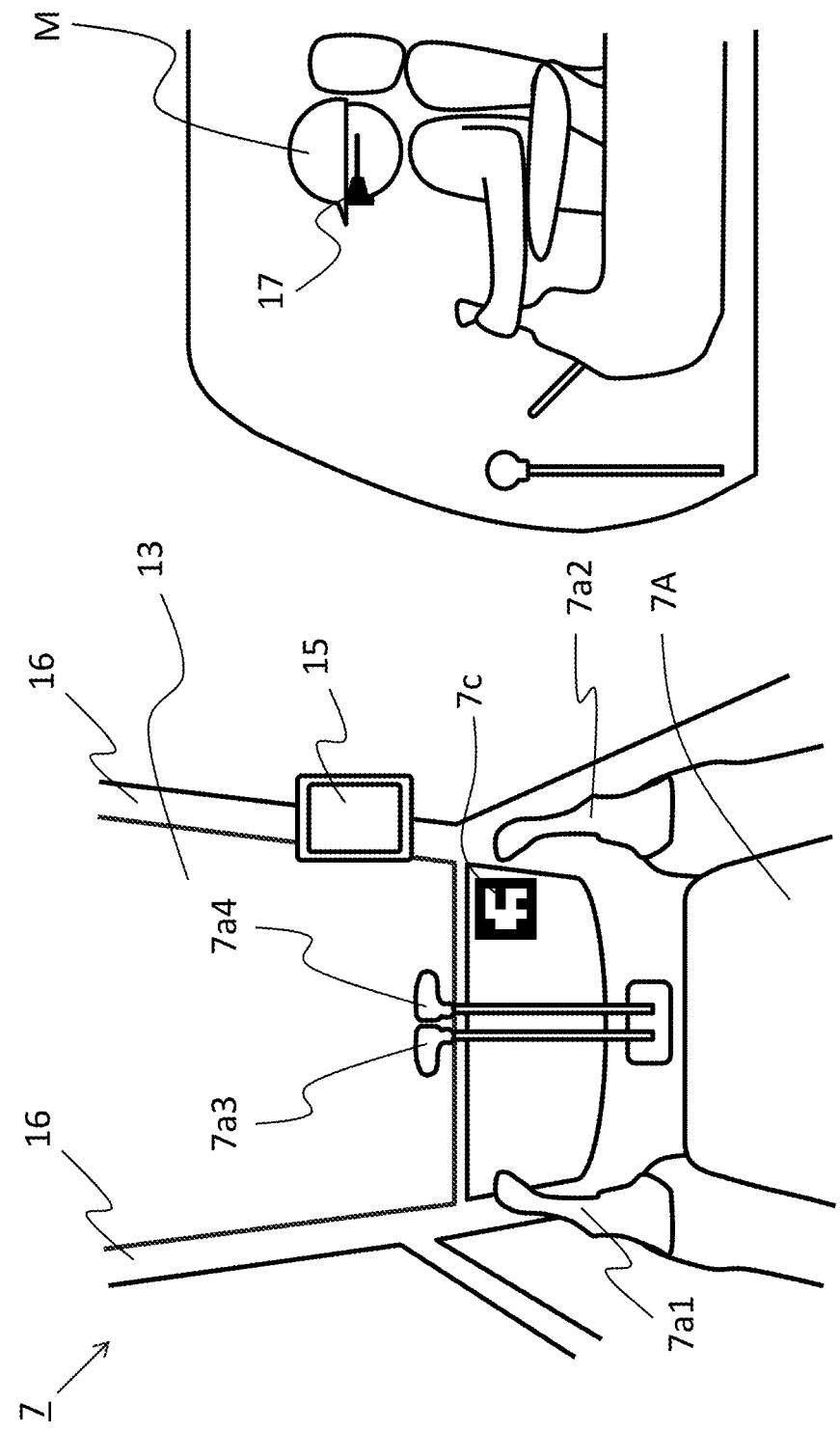
FIG. 2 is an overview diagram of the inside of a cab 7 according to the embodiment of the present invention.

FIG. 2 is an overview diagram of the inside of the cab 7. The same part as the previous diagram is given the same numeral and description of the same part is omitted in some cases (the same applies also to subsequent diagrams). As illustrated in FIG. 2, in the cab 7, an operation seat 7A on which the operator M sits and four operation levers 7a1 to 7a4 as operation devices to make instructions on operation of the machine body including operation of the respective hydraulic actuators 3a to 3c are disposed.

The operation lever 7a1 (operation left lever) is a lever for operating the arm cylinder 3b (arm 1b) and the upper swing structure 1B (swing hydraulic motor (not illustrated)) and the operation lever 7a2 (operation right lever) is a lever for operating the boom cylinder 3a (boom 1a) and the bucket cylinder 3c (bucket 1c). Furthermore, the operation lever 7a3 (traveling left lever) is a lever for operating the lower track structure 1e (left traveling hydraulic motor (not illustrated)) and the operation lever 7a4 (traveling right lever) is a lever for operating the lower track structure 1e (right traveling hydraulic motor (not illustrated)).

The cab 7 is supported by plural pillars 16 and a windshield (front window) 13 is embedded between two pillars 16 on the front side. Furthermore, a two-dimensional marker 7b is attached to the windshield 13 set on the front side of the cab 7 and an input device 15 of a touch panel system is attached to the pillar 16 on the right side as viewed from the operator M who sits on the operation seat 7A. With the input device 15, it is possible to input machine rank data on the hydraulic excavator 1, specification data on the front work implement 1A, work item information for specifying a subject of calibration work, and work procedure information (referred to also as target posture data) for specifying target measurement posture by the rotation angle of the respective front members 1a, 1b, and 1c. The input device 15 may double as a display device.

On the head of the operator M who rides on the hydraulic excavator 1 and sits on the operation seat 7A, a head-mounted display (hereinafter, HMD) 17 is mounted as a display device including a transmissive display (half mirror 17G) disposed on the front side of the operator M.

Figure 3:
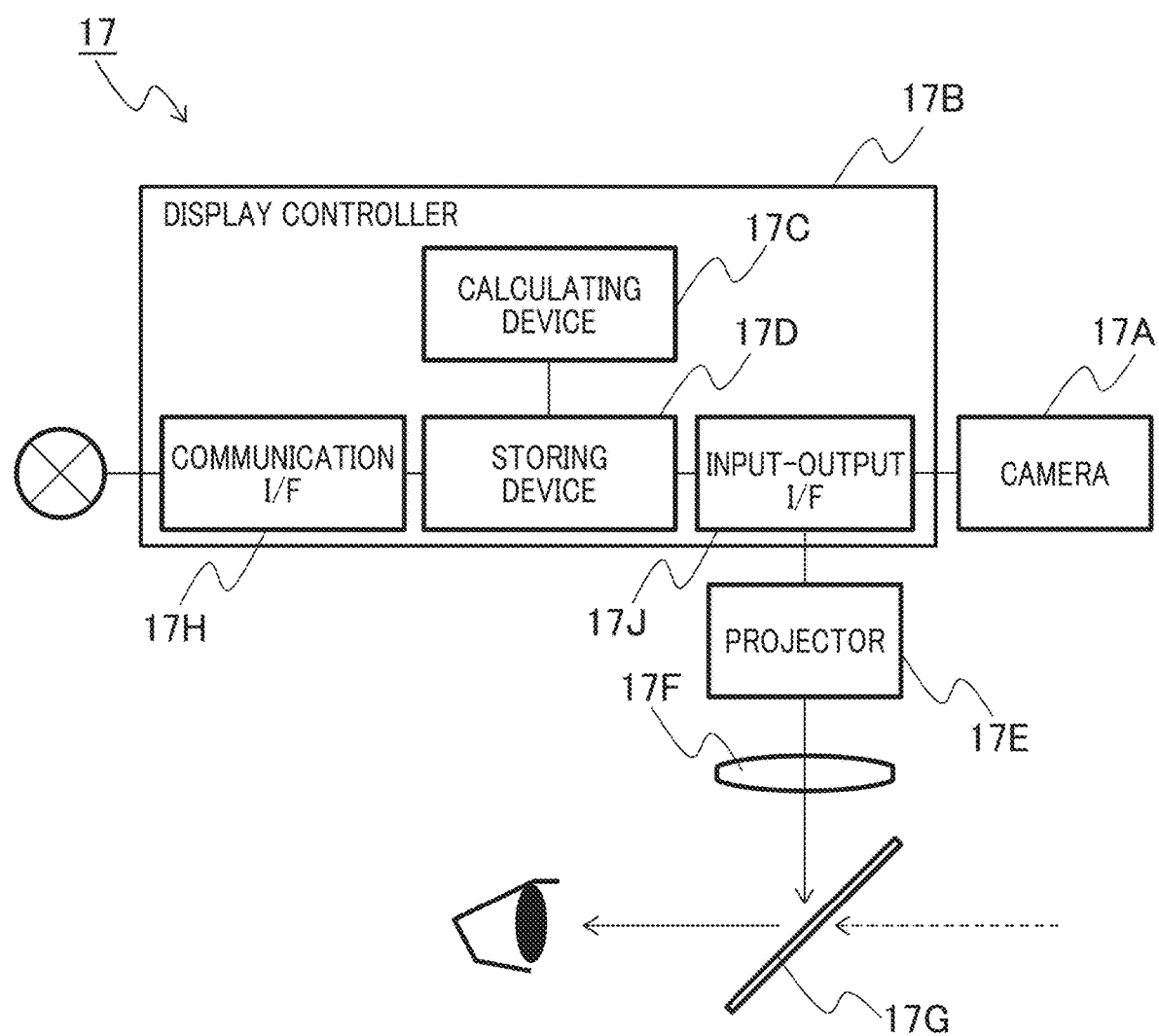
FIG. 3 is a hardware configuration diagram of a head-mounted display according to the embodiment of the present invention.

FIG. 3 is a hardware configuration diagram of the HMD 17. As illustrated in FIG. 3, the HMD 17 includes a camera 17A as a measurement device that measures the point-of-view position and the line-of-sight direction of the operator M by photographing the two-dimensional marker 7b and a display controller 17B that generates a target posture image (referred to also as support image) that is an image of the case in which the front work implement 1A that takes the target measurement posture is viewed from the point-of-view position of the operator M in the line-of-sight direction of the operator M. The HMD 17 includes also a projector 17E that outputs the target posture image generated by the display controller 17B, a lens 17F that enlarges and reduces the target posture image output from the projector 17E, and the half mirror 17G that is a transmissive display onto which the target posture image that has passed through the lens 17F is projected. The half mirror 17G functions as a display device that displays the target posture image. Meanwhile, the half mirror 17G is configured to be capable of superimposing the target posture image on the actual front work implement 1A viewed with the point-of-view position and the line-of-sight direction of the operator M due to the transmissibility thereof.

The camera 17A is mounted on the main body of the HMD 17 and the position and the optical axis direction thereof change according to motion of the head of the operator M. The half mirror 17G is disposed on the front side of the pupils of the operator M who wears the HMD 17 and has a structure having both transmissibility and reflectivity. Therefore, the operator M can visually recognize the target posture image projected on the half mirror 17G and the actual view on the front side (including also the actual front work implement 1A) simultaneously. The display controller 17B includes a calculating device 17C (for example, CPU), a storing device 17D (for example, semiconductor memories such as ROM and RAM), a communication interface (I/F) 17H, and an input-output I/F 17J. In the storing device 17D, model data of the front work implement 1A serving as the basis of the target posture image is stored in advance in association with machine information to be described later regarding each front member. Besides, internal parameters of the camera 17A and a pattern file of the two-dimensional marker 7b are stored. Furthermore, the HMD 17 is connected to a network through the communication I/F 17H and can execute data communication with the input device 15.

Figure 4:
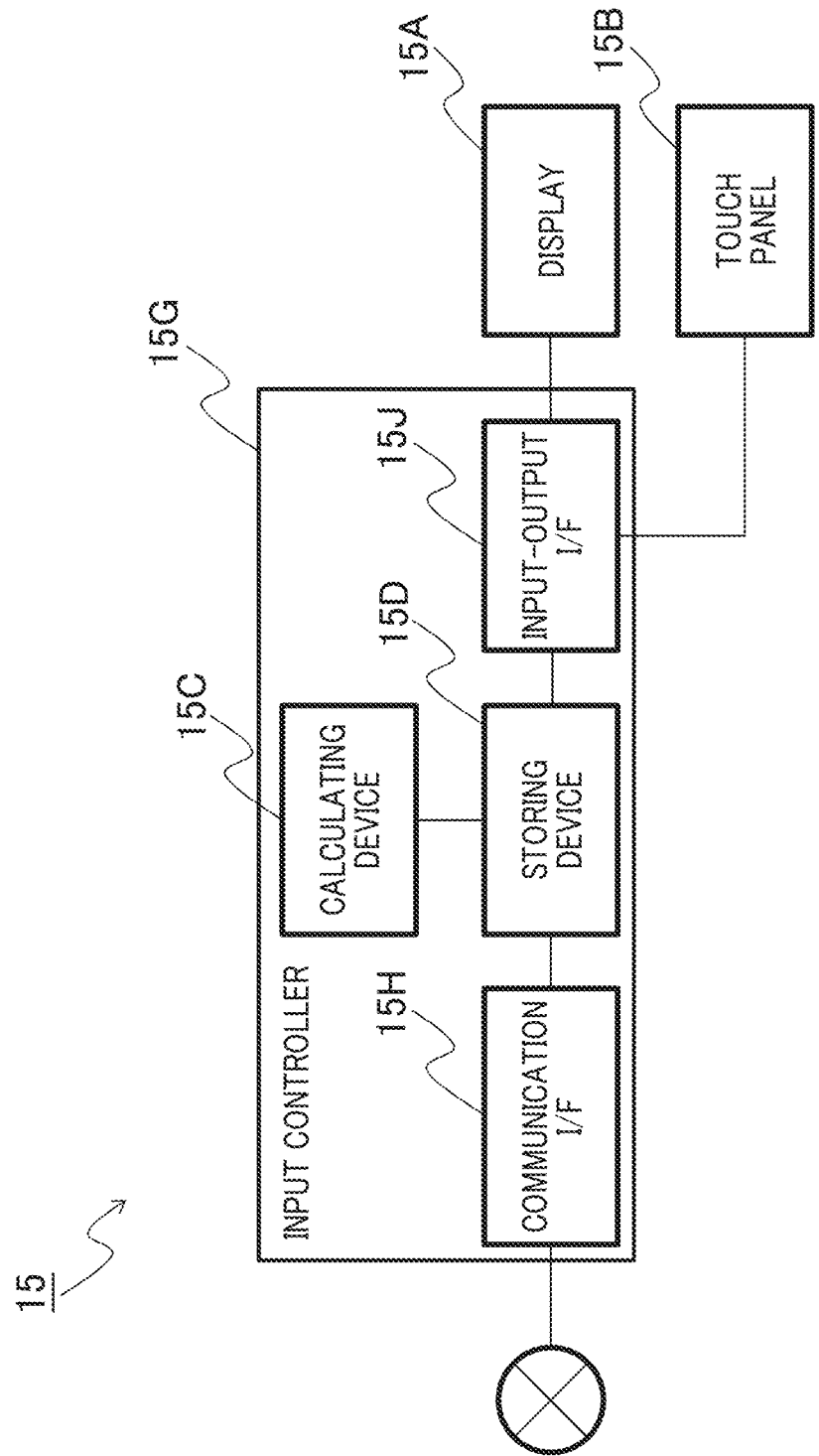
FIG. 4 is a hardware configuration diagram of an input device according to the embodiment of the present invention.

FIG. 4 is a hardware configuration diagram of the input device 15. The input device 15 illustrated in this diagram includes a display (display device) 15A, a touch panel (position input device) 15B stuck to the upper surface of the display 15A, and an input controller 15G that controls the display 15A and the touch panel 15B. The input controller 15G includes a calculating device 15C (for example, CPU), a storing device 15D (for example, semiconductor memories such as ROM and RAM), a communication I/F 15H, and an input-output I/F 15J similarly to the display controller 17B.

Figure 5:
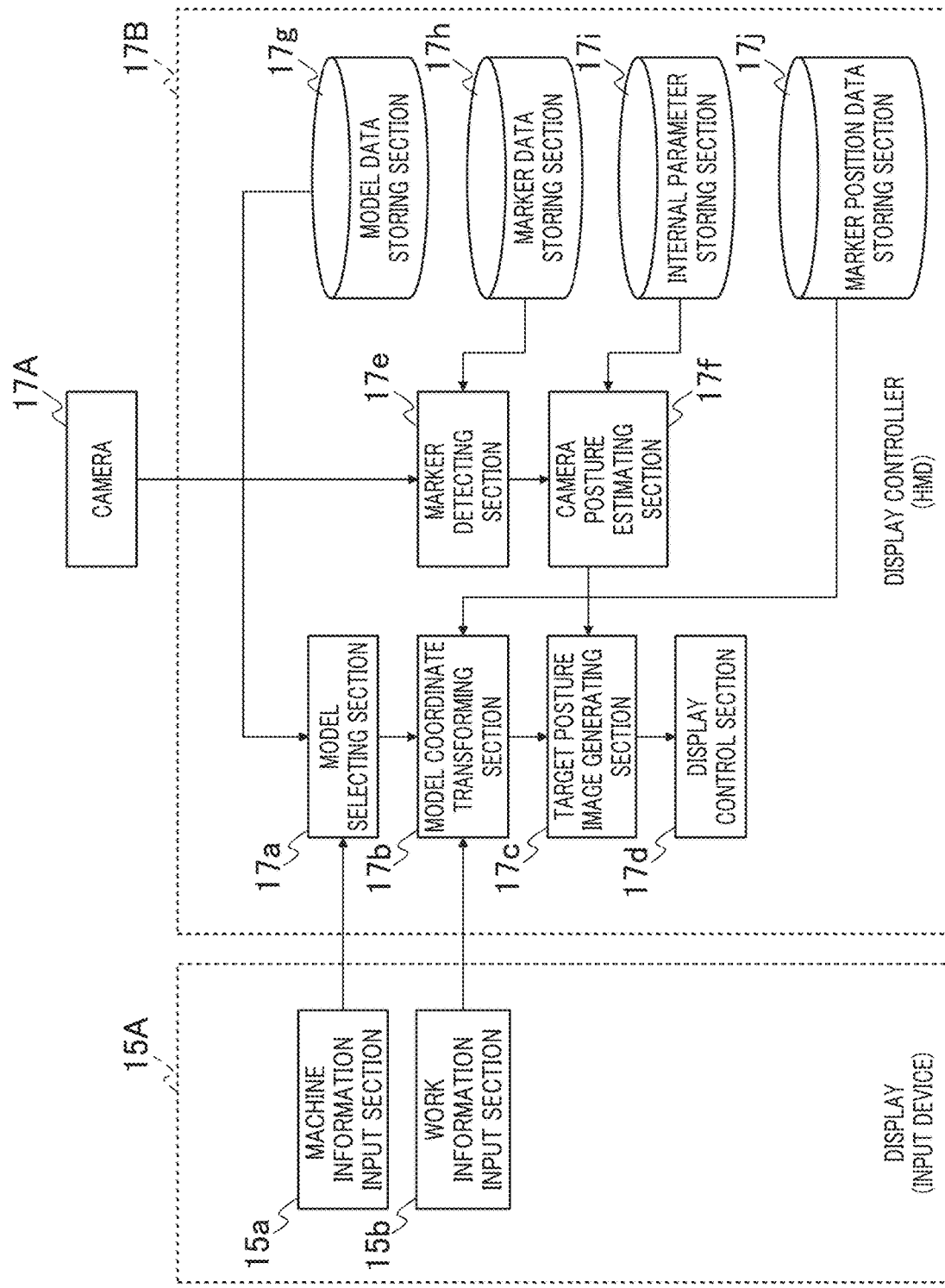
FIG. 5 is a functional block diagram of a calibration work support system according to the embodiment of the present invention.

FIG. 5 is a functional block diagram of a calibration work support system according to the embodiment of the present invention. The display controller 17B of the HMD 17 functions as the respective sections illustrated in FIG. 5 by executing a program stored in the storing device 17D by the calculating device 17C with use of information (machine information and work information (see FIG. 7) to be described later) input to the display 15A (touch panel 15B) of the input device 15 by the operator M.

Figure 7:
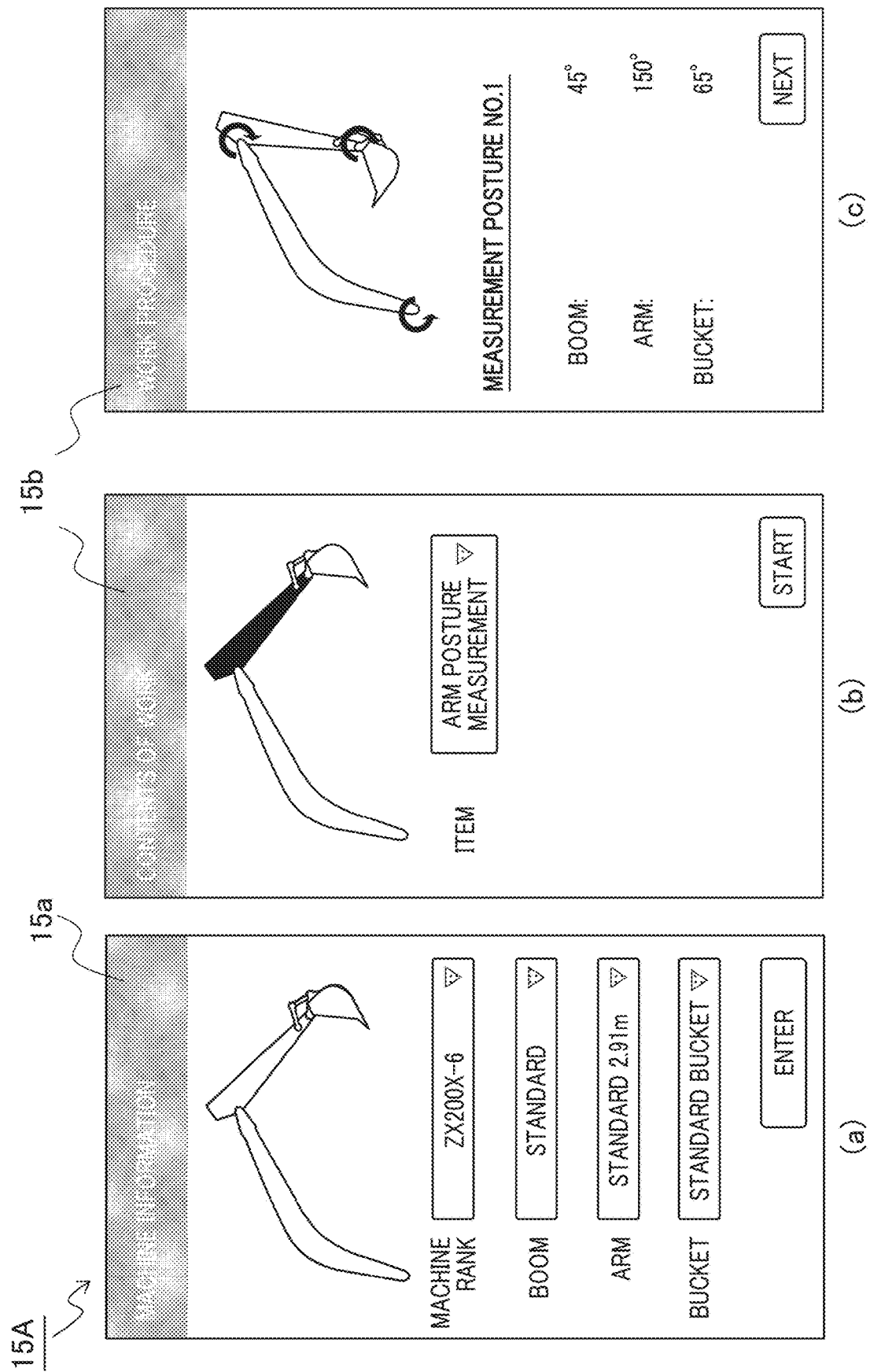
FIG. 7 is a layout configuration diagram of input screens of the input device according to the embodiment of the present invention.

FIG. 7 is a diagram illustrating a machine information input screen (a), a contents-of-work input screen (b), and a work procedure input screen (c) displayed on the display 15A of the input device 15.

In the machine information input screen (a), a machine information input section 15a that accepts, from the operator M, input of "machine information" including the machine rank data on the hydraulic excavator 1 and specification data on the respective parts of the front work implement 1A (for example, there are standard boom, two-piece boom, high-lift boom, and so forth as the specification of the boom) is set. In the example of FIG. 7, the machine rank data and the specification data on each part are configured to be selected from a pull-down menu by the operator M.

In each of the contents-of-work input screen (b) and the work procedure input screen (c), a work information input section 15b that accepts input of "work information" in calibration of the inertial measurement devices S1, S2, and S3 from the operator M is set. In the work information input section 15b of the contents-of-work input screen (b), information on the work item in the "work information" ("work item information" is data that prescribes which front member in the plural front members (boom, arm, attachment (bucket)) to which the inertial measurement devices are attached is to be employed as the subject of posture measurement, i.e. the subject of calibration work) is input. In the work information input section 15b of the work procedure input screen (c), information on the work procedure in the "work information" ("work procedure information" is data defined in advance as the target measurement posture of the front work implement 1A in calibration of the inertial measurement device on the front member selected in the work item) is input. In the example of FIG. 7, the information on the work item (front member that becomes the subject of posture measurement) is configured to be selected from a pull-down menu by the operator M. Regarding the information on the work procedure, plural measurement postures set in advance may be automatically displayed in order defined in advance or the operator M may manually input the angle of each front member to take plural target measurement postures.

The machine information and the work information input by the operator M from each of the input screens (a), (b), and (c) are transmitted to the HMD 17 through a network.

In FIG. 5, the display controller 17B includes a model selecting section 17a that selects model data of the front work implement 1A corresponding to the subject machine from a model data storing section 17g on the basis of the machine information input by the input device 15 and a model coordinate transforming section 17b that transforms the coordinates of the model data on the basis of the machine information and the work information input by the input device 15 and attachment position data on the marker 7b stored in a marker position data storing section 17j. The display controller 17B includes also a target posture image generating section 17c that generates an image (target posture image) of the case in which the front work implement 1A that takes the target measurement posture is viewed from the operator M on the basis of the machine information and the work information (target measurement posture is included in the work information) input from the input device 15 and the point-of-view position and the line-of-sight direction of the operator M computed based on the posture of the camera 17A and a display control section 17d that projects the target posture image generated in the target posture image generating section 17c onto the half mirror 17G. The display controller 17B includes also a marker detecting section 17e that detects the marker 7b from a photographed image by the camera 17A on the basis of data including the shape and the size of the marker 7b read out from a marker data storing section 17h and a camera posture estimating section 17f that computes the position and the posture of the camera 17A (external parameters of the camera 17A) on the basis of the shape and the size of the marker 7b detected by the marker detecting section 17e and internal parameters of the camera 17A stored in an internal parameter storing section 17i. The display controller 17B includes also the model data storing section 17g in which pieces of model data of plural front work implements 1A in conformity with the machine rank and the specifications are stored, the marker data storing section 17h in which the data including the shape and the size of the marker 7b is stored, the internal parameter storing section 17i in which the internal parameters (for example, focal length and optical center) of the camera 17A are stored, and the marker position data storing section 17j in which the attachment position data on the marker 7b in the cab 7 (for example, position based on the position of a root pin (boom pin) of the boom 1a) is stored.

(Flowchart of Target Posture Image Generation by Display Controller 17B of HMD 17)

Figure 6:
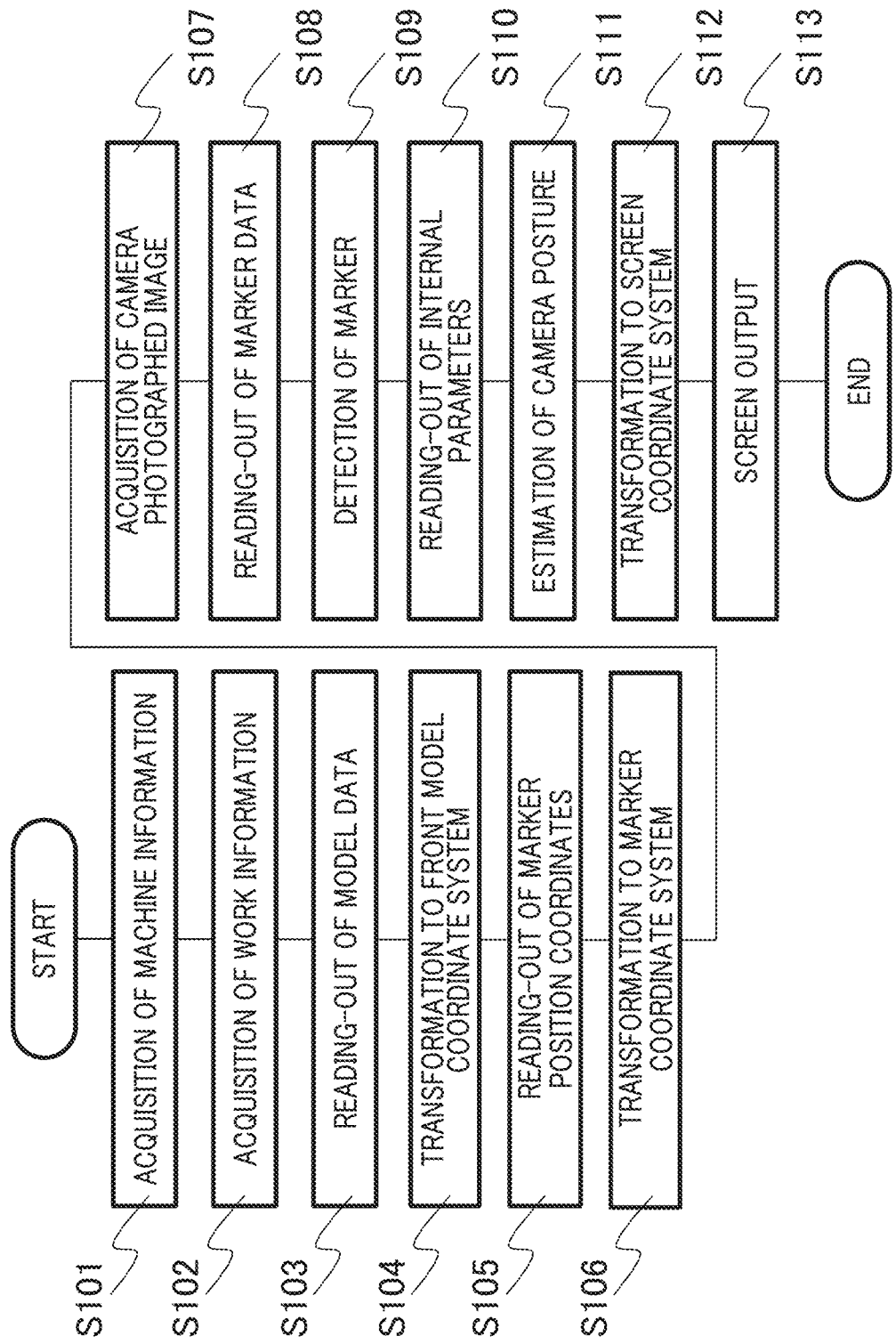
FIG. 6 is a flowchart of target posture image generation by a display controller of the head-mounted display.

A method for generating the target posture image by the display controller 17B of the HMD 17 will be described with reference to FIG. 6. FIG. 6 is a flowchart of target posture image generation by the display controller 17B of the HMD 17. The display controller 17B executes the flow of FIG. 6, with input of a start instruction on calibration work from the operator M being the trigger, to project the target posture image onto the half mirror 17G.

When the start instruction on calibration work from the operator M is input from the input device 15 to the display controller 17B, the display controller 17B starts the flow of FIG. 6 to execute acquisition of the machine information (S101) and acquisition of the work information (S102). As the machine information of S101, data input to the machine information input section 15a of the input device 15 by the operator M is input to the input display controller 17B. In the machine information, the machine rank of the machine that becomes the subject of calibration work (hereinafter, subject machine) and the specifications of the respective front members (boom 1a, arm 1b, and bucket 1c) that configure the front work implement 1A are included. As the work information of S102, data input to the work information input section 15b of the input device 15 by the operator M is input to the display controller 17B similarly to the machine information. In the work information, the work item of calibration work (front member to which the inertial measurement device of the calibration subject is attached) and the work procedure of the work item (target measurement posture that should be taken by the front work implement 1A in order to calibrate the calibration subject) are included.

In S103, the model selecting section 17a reads out the model data corresponding to the subject machine from the model data storing section 17g on the basis of the machine information acquired in S101. As described above, the model data is associated with the machine information and is stored in the model data storing section 17g in advance. The model data is stored in units of front members (parts) such as the boom 1a, the arm 1b, and the bucket 1c and corresponds to various specifications such as standard boom and two-piece boom. That is, the model selecting section 17a reads out the model data corresponding to the input machine rank and specifications.

(Transformation from Model Coordinate System to Front Model Coordinate System)

In S104, based on the machine information and the work information, the model coordinate transforming section 17b executes coordinate transformation of the model data of the respective parts read out in S103 from the model coordinate system of each part to the front model coordinate system and generates model data of the whole of the front work implement 1A (hereinafter, referred to as front model data) that takes appropriate target measurement posture prescribed based on the work item and the work procedure.

Figure 9:
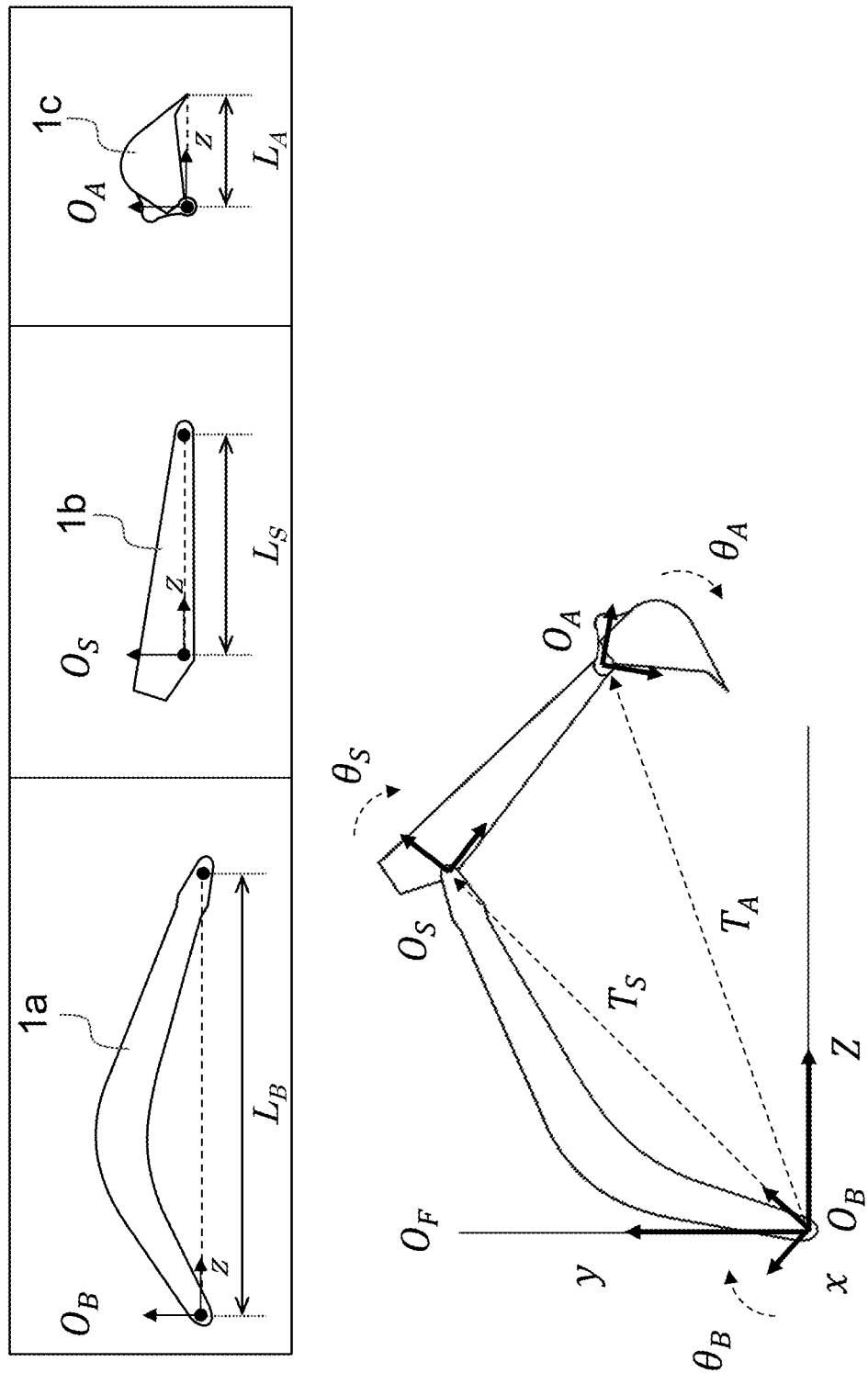
FIG. 9 is a diagram illustrating the relation between model coordinate systems of front members and a front coordinate system of a front work implement according to the embodiment of the present invention.

Details of the method of the transformation to the front model coordinate system in S104 will be described with reference to FIG. 9. FIG. 9 is a diagram illustrating the relation between the coordinate system of each part of the front work implement 1A and the front model coordinate system. When the front model coordinate system is defined as a left-handed orthogonal coordinate system in which the longitudinal direction of each part of the front work implement 1A is defined as the Z-axis (front side of the front is positive), transformation from part model data $(x_m, y_m, z_m)$ to the front model data $(x_f, y_f, z_f)$ of the target measurement posture can be executed by using the following expression (see Expression 1). $\theta$ is the rotation angle of each part in association with the work information acquired by the work information input section 15b and $(T_x, T_y, T_z)$ represents a translation vector of each part.

$$\begin{pmatrix} x_f \\ y_f \\ z_f \end{pmatrix} = \begin{pmatrix} 1 & 0 & 0 \\ 0 & \cos\theta & -\sin\theta \\ 0 & \sin\theta & \cos\theta \end{pmatrix} \begin{pmatrix} x_m \\ y_m \\ z_m \end{pmatrix} + \begin{pmatrix} T_x \\ T_y \\ T_z \end{pmatrix} \quad \text{[Expression 1]}$$

As described above, the translation vector ($T_x$, $T_y$, $T_z$) differs for each part of the front work implement 1A. Assuming that the front work implement 1A of the machine that becomes the subject of calibration work is configured with the boom 1a, the arm 1b, and the bucket 1c, a translation vector $T_B$ of the boom 1a, a translation vector $T_S$ of the arm 1b, and a translation vector $T_A$ of the bucket 1c are each represented by the following expression (see Expression 2). Here, $L_B$ represents the boom length. $L_S$ represents the arm length. $L_A$ represents the bucket length. $\theta_B$ represents the boom rotation angle. $\theta_S$ represents the arm rotation angle.

$$T_B = 0 \quad \text{[Expression 2]}$$

$$T_S = \begin{pmatrix} 0 \\ L_B \cos\theta_B \\ L_B \sin\theta_B \end{pmatrix}$$

$$T_A = \begin{pmatrix} 0 \\ L_B \cos\theta_B + L_S \cos(\theta_B + \theta_S) \\ L_B \sin\theta_B + L_S \sin(\theta_B + \theta_S) \end{pmatrix}$$

(Transformation from Front Model Coordinate System to Marker Coordinate System)

Moreover, the model coordinate transforming section 17b reads out the attachment position data on the marker 7b in the operation seat 7 (for example, position based on the position of the root pin (boom pin) of the boom 1a) from the marker position data storing section 17j in S105 and executes coordinate transformation from the front model coordinate system to a marker coordinate system on the basis of the rotation axis on the base end side of the boom 1a (S106). Thereby, the position of the root pin of the boom 1a of the actual front work implement 1A is made to correspond with the position of the root pin of the boom of the front model data.

Figure 10:
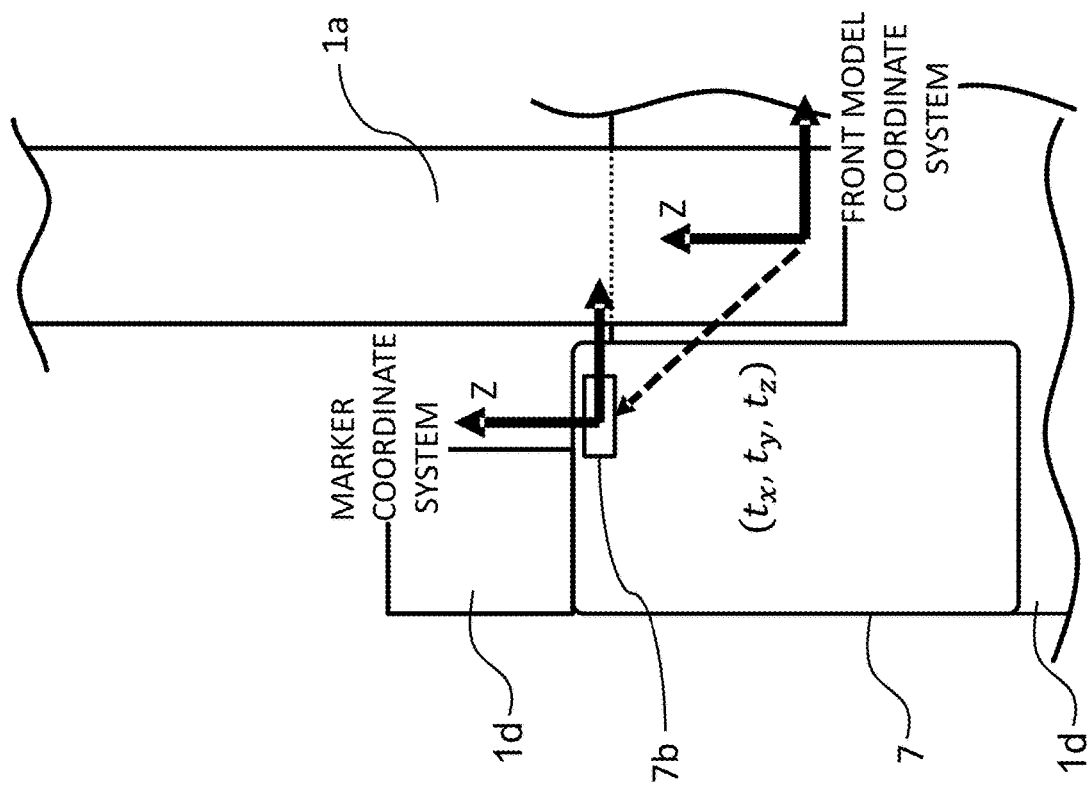
FIG. 10 is a diagram illustrating the positional relation between the position of a root pin of a boom and the marker position according to the embodiment of the present invention.

Details of the transformation to the marker coordinate system in S106 will be described with reference to FIG. 10. FIG. 10 is a diagram illustrating the relation between the front model coordinate system and the marker coordinate system. When the marker coordinate system is defined as a left-handed orthogonal coordinate system in which the marker center is defined as the origin and the direction orthogonal to the marker plane is defined as the Z-axis (front side of the machine body is positive), coordinates ($x_r$, $y_r$, $z_r$) of the front model data after the transformation to the marker coordinate system are represented by the following expression with use of a distance vector ($t_x$, $t_y$, $t_z$) from the center position of the boom pin of the actual hydraulic excavator 1 to the attachment center position of the marker. Suppose that the attachment position data on the marker 7b is stored in the marker position data storing section 17j in advance and the marker 7b is set in parallel to the root pin of the boom.

$$\begin{pmatrix} x_r \\ y_r \\ z_r \end{pmatrix} = \begin{pmatrix} x_f \\ y_f \\ z_f \end{pmatrix} - \begin{pmatrix} t_x \\ t_y \\ t_z \end{pmatrix} \quad \text{[Expression 3]}$$

(Detection of Marker)

In S107, the marker detecting section 17e acquires an image (photographed image) of the front side of the operator M photographed by the camera 17A. Subsequently, the marker detecting section 17e executes image processing such as edge detection on the photographed image acquired in S107, and reads out the data including the shape and the size of the marker from the marker data storing section 17h (S108) and detects the marker 7b that appears in the photographed image on the basis of the data (S109).

Specifically, the marker detecting section 17e converts the photographed image to a binarized image by executing threshold processing of converting the brightness value of each pixel to 0 or 255 by using a threshold for the photographed RGB image as pre-processing for detecting the marker 7b from the photographed image photographed by the camera 17A. Next, edge detection processing is executed in order to detect the contour of the marker 7b. Pixels across which the brightness difference is large are employed as edges. In the edge detection, for example, a Sobel filter is used and convolution calculation of the binarized image and a kernel of the Sobel filter is executed to thereby detect edges of the horizontal direction and the vertical direction. Moreover, a liner approximation is executed on the detected edges. The least squares method or the Hough transform is used for the linear approximation. By the linear approximation, the intersection coordinates of approximated straight lines are acquired as the vertexes of the marker rectangle. Moreover, the marker detecting section 17e detects a rectangular region defined by the four vertexes of the marker rectangle acquired from the photographed image after the image processing (that is, region in which the marker 7b appears) and executes pattern matching between the shape of the rectangular region and the shape of the marker 7b (template pattern) stored in the marker data storing section 17h in advance as parameter data of a vector format. Then, when the matching rate of both exceeds a predetermined threshold, the marker detecting section 17e determines that the rectangular region detected in the photographed image corresponds to the marker 7b and the marker 7b appears in the photographed image by the camera 17A.

(Estimation of Position and Posture of Camera 17A in Marker Coordinate System)

The camera posture estimating section 17f reads out the internal parameters of the camera 17A in S110 and computes external parameters of the camera 17A (posture and position of the camera 17A) on the basis of the internal parameters and the shape of the marker 7b detected in S109 (that is, shape of the marker 7b on the photographed image by the camera 17A) (S111). The posture and the position of the camera 17A can be rephrased as the optical axis direction and the attachment position of the camera 17A. The point-of-view position and the line-of-sight direction of the operator M can be calculated from the posture and the position of the camera 17A. The internal parameters are hardware-specific parameters that include distortion of the camera 17A and do not depend on change in the position and the posture of the camera 17A and are stored in advance in the internal parameter storing section 17i that is a storage area set in the storing device 17D.

Here, details of the estimation of the posture and the position of the camera 17A in S111 will be described. Also regarding the estimation method of the posture and the position of the camera 17A, only the procedure is described whereas details are omitted because the estimation method is publicly known in general.

First, transformation from the marker coordinate system to a camera coordinate system can be expressed by using the external parameters that represent the posture and the position of the camera 17A estimated in S111.

Meanwhile, transformation from the camera coordinate system to a screen coordinate system can be represented by using the internal parameters of the camera 17A. Here, the internal parameters include the origin of the screen coordinate system set in the half mirror 17G, the focal length of the camera 17A, the scale factor of the pixel, distortion of the camera 17A in the radial direction and the circumferential direction.

Therefore, transformation from the marker coordinate system to the screen coordinate system can be expressed by a perspective projection matrix with combination of the external parameters and the internal parameters of the camera 17A. The perspective projection matrix is a 3×4 matrix and therefore the number of unknowns is 12. However, the fact that multiplication by a constant can be ignored and the fact that the vertexes of the marker 7b exist on the same plane in the marker coordinate system are deemed as constraint conditions, and thus the number of unknowns becomes 7. Therefore, equations can be solved as long as there are four sets of combination between the vertex coordinates of the marker 7b in the camera coordinate system computed from the photographed image by the camera 17A and the vertex coordinates of the marker 7b in the marker coordinate system. That is, the elements of the perspective projection matrix can be obtained from the coordinates of the four vertex coordinates of the marker 7b in the camera coordinate system detected by the marker detecting section 17e.

As described above, the perspective projection matrix arises from combination of the internal parameters and the external parameters of the camera 17A and the external parameters of the camera 17A, i.e. the position and the posture of the camera 17A, can be obtained from the perspective projection matrix obtained from the vertexes of the marker 7b and the internal parameters, which are known.

(Transformation from Marker Coordinate System to Screen Coordinate System and Generation of Target Posture Image)

Figure 8:
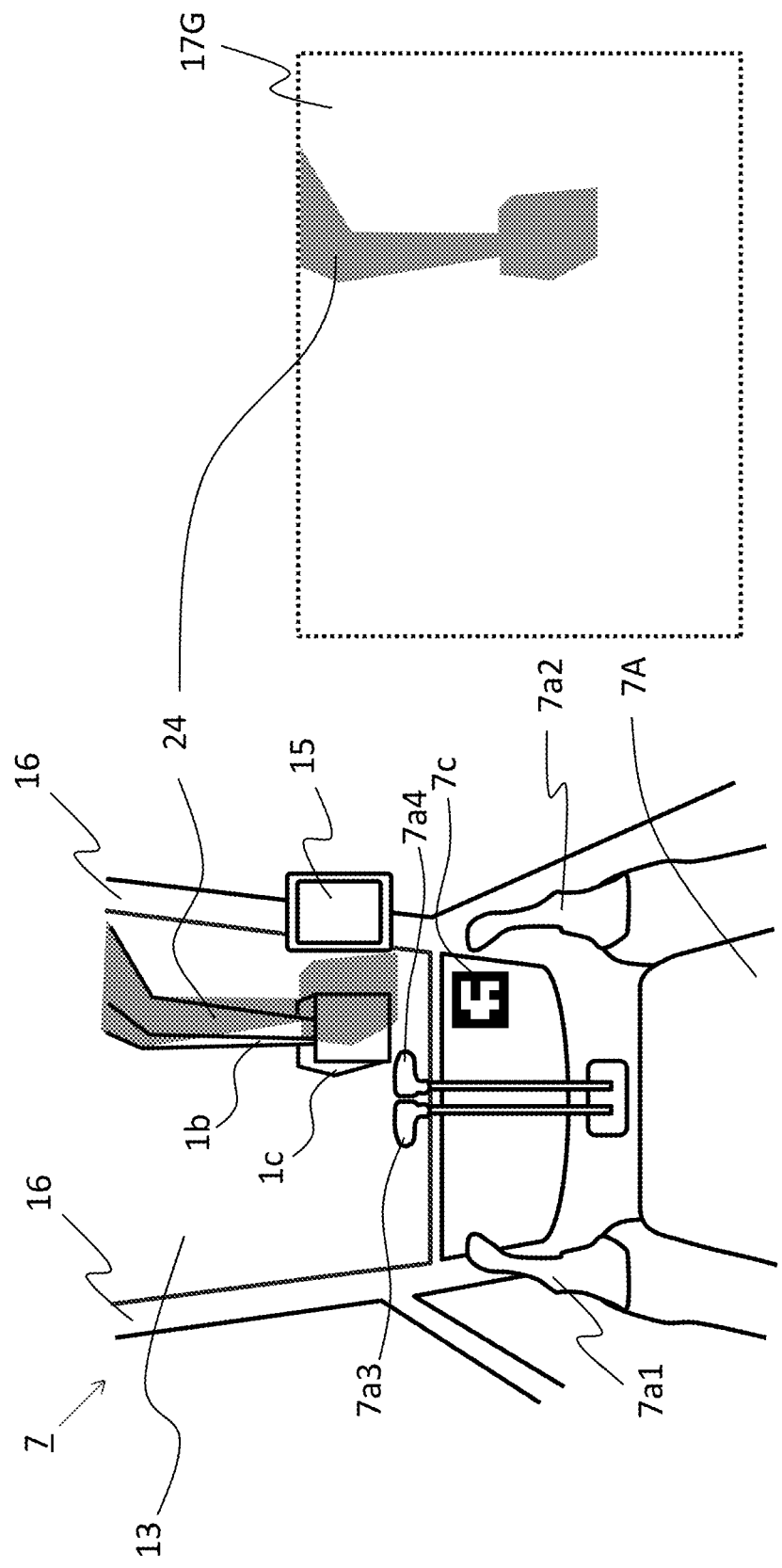
FIG. 8 is a diagram illustrating one example of a support image presented to an operator by the calibration work support system according to the embodiment of the present invention.

In S112, the target posture image generating section 17c transforms the front model data in the marker coordinate system to the screen coordinate system set in the half mirror 17G by using the perspective projection matrix expressed with use of the posture and the position of the camera 17A (external parameters of the camera 17A) acquired in S111 and the internal parameters of the camera 17A (perspective projection transformation). By this perspective projection transformation, the front model data is transformed from the three-dimensional marker coordinate system to the two-dimensional screen coordinate system. The image of the front model data subjected to the perspective projection transformation in this manner is a target posture image 24 that is illustrated on the right side of FIG. 8 and represents the target measurement posture of the front work implement 1A viewed from the operator M. The display control section 17d outputs the target posture image 24 generated in the target posture image generating section 17c to the projector 17E and thereby the target posture image 24 is projected onto the half mirror 17G (S113). On the left side of FIG. 8, the state in which the target posture image 24 is superimposed on the actual front work implement 1A visible for the operator M through the half mirror 17G is illustrated. That is, the HDM 17 (half mirror 17G) of the present embodiment functions as a display device configured to be capable of superimposing the target posture image 24 on the actual front work implement 1A viewed with the point-of-view position and the line-of-sight direction of the operator M.

(Calibration Work)

Next, a controller (calibration work control device) 20 necessary for calibration work of the inertial measurement devices S1, S2, and S3 will be described. This controller 20 is used every time the target measurement posture is taken with the actual front work implement 1A by using the HMD 17.

Figure 11:
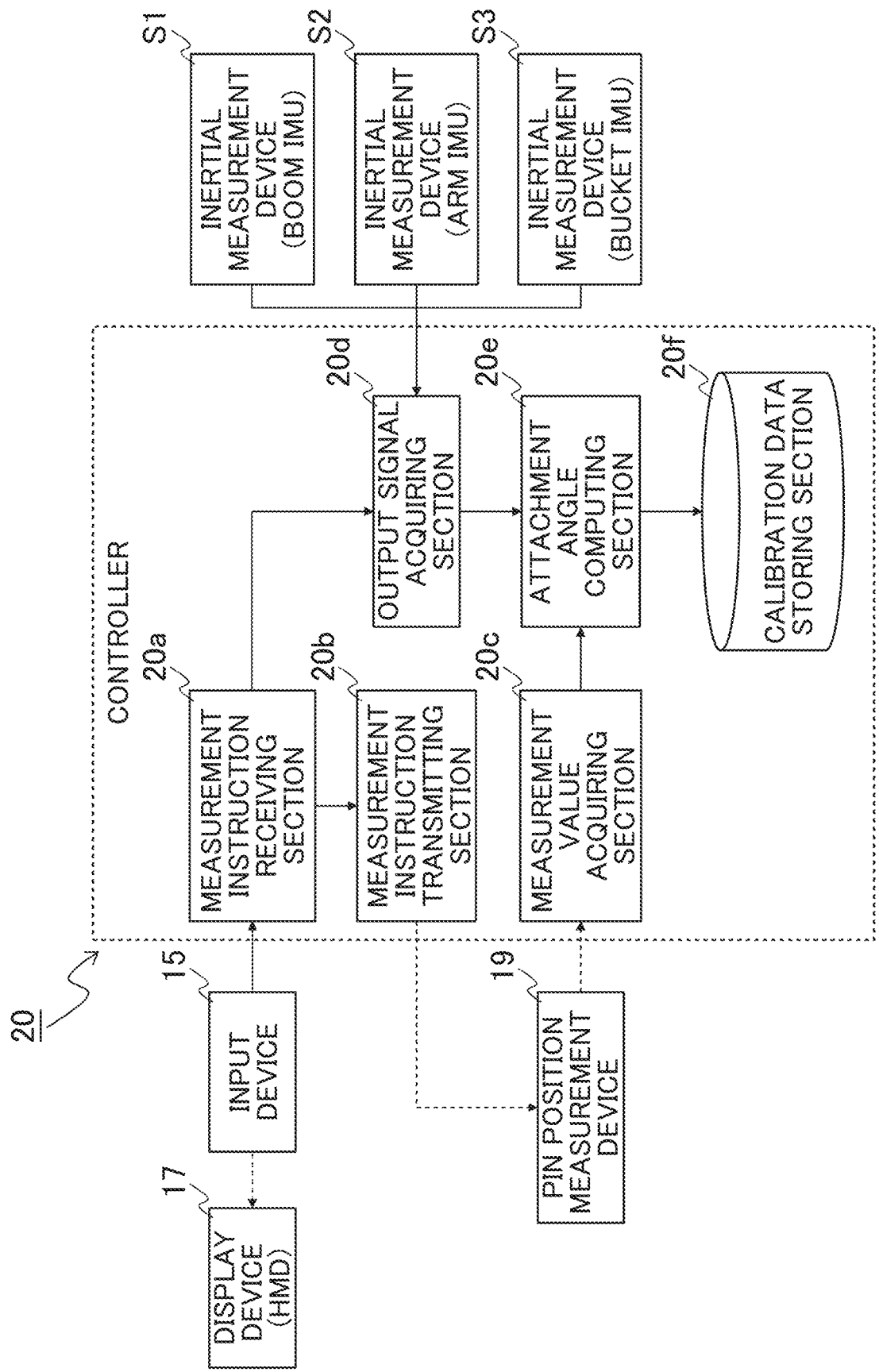
FIG. 11 is a schematic configuration diagram of a system necessary for calibration work of inertial measurement devices S1, S2, and S3 according to the embodiment of the present invention.

FIG. 11 is a schematic configuration diagram of a system necessary for calibration work of the inertial measurement devices S1, S2, and S3. The system illustrated in this diagram includes the controller (calibration work control device) 20 that acquires output signals of the inertial measurement devices S1, S2, and S3 and is responsible for calibration work and a pin position measurement device (for example, total station) 19 that measures the three-dimensional position coordinates of the respective pins p1 to p6 that join the front members 1a, 1b, and 1c of the front work implement 1A and a bucket claw tip p7 (see FIG. 13 to be described later). The controller 20 can be mounted in the hydraulic excavator 1 and is connected to the input device 15, the inertial measurement devices S1, S2, and S3, and the pin position measurement device 19 in such a manner as to be capable of data communication. The controller 20 may be configured in the HMD 17 or the input device 15 by installing a program on the display controller of the HMD 17 or the input controller of the input device 15, or may be configured in a computer independent of the hydraulic excavator 1.

Similarly to the display controller 17B and the input controller 15G, the controller 20 includes a calculating device, a storing device, a communication I/F, and an input-output I/F (none are illustrated) and functions as the respective sections illustrated in FIG. 11 by executing a program stored in the storing device by the calculating device. The controller 20 functions as a measurement instruction receiving section 20a, a measurement instruction transmitting section 20b, a measurement value acquiring section 20c, an output signal acquiring section 20d, and an attachment angle computing section 20e and ensures a calibration data storing section 20f in a storage area in the storing device. In addition to description of the respective sections of the controller 20, description will be made about a flowchart of processing executed in the controller 20 by using FIG. 12.

Figure 12:
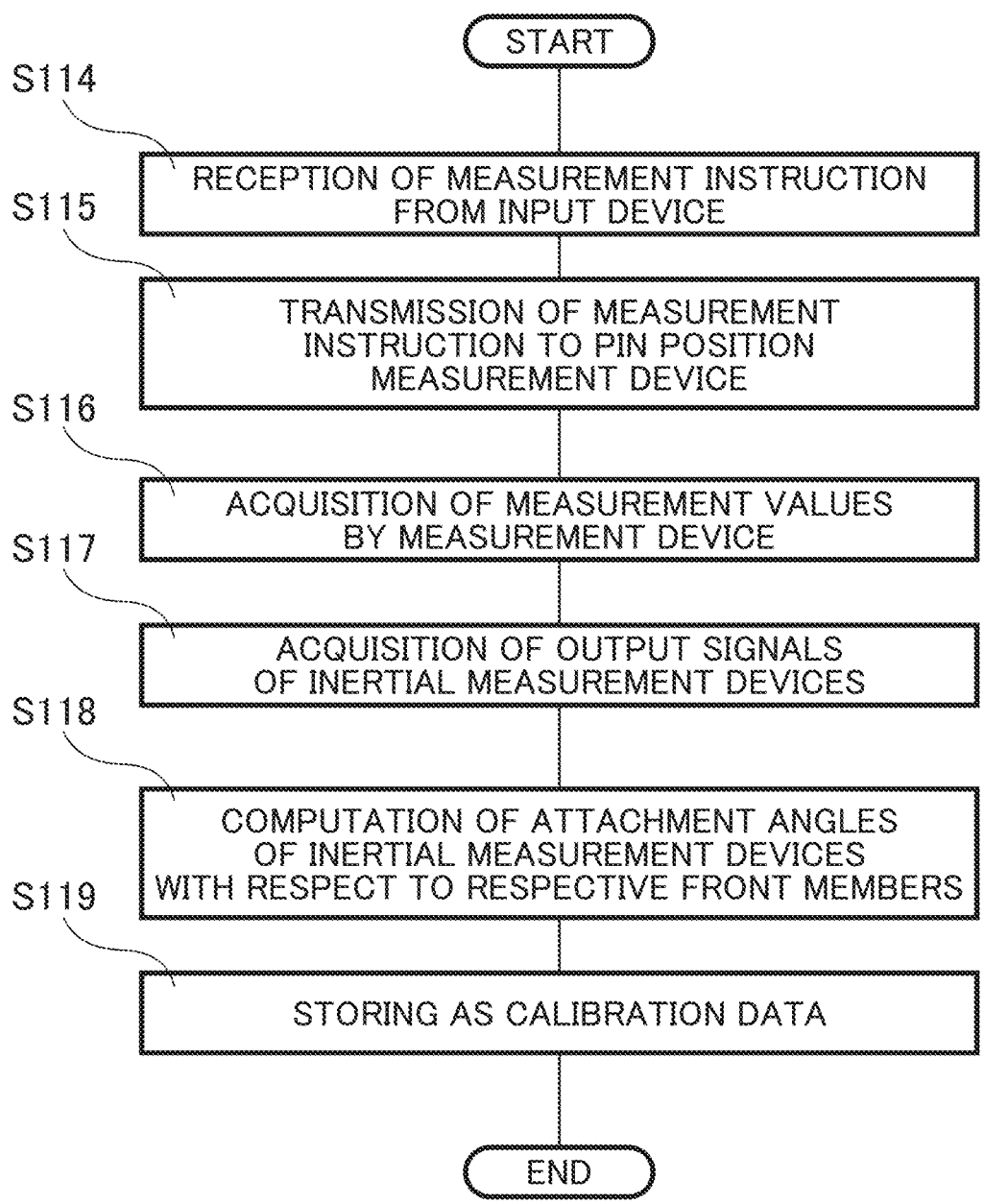
FIG. 12 is a flowchart of calibration work processing executed by a controller according to the embodiment of the present invention.

FIG. 12 is a flowchart of calibration work processing executed by the controller 20.

When the operator M touches a calibration work start button on the display 15A after setting the posture of the front work implement 1A to the target measurement posture on the basis of the target posture image 24 displayed on the HMD 17, a measurement instruction signal is output and the controller 20 starts the flowchart illustrated in FIG. 12. Upon the start of the flow, the measurement instruction receiving section 20a of the controller 20 connected to the input device 15 through an electrical harness or the like acquires the measurement instruction signal output from the input device 15 (S114).

Figure 13:
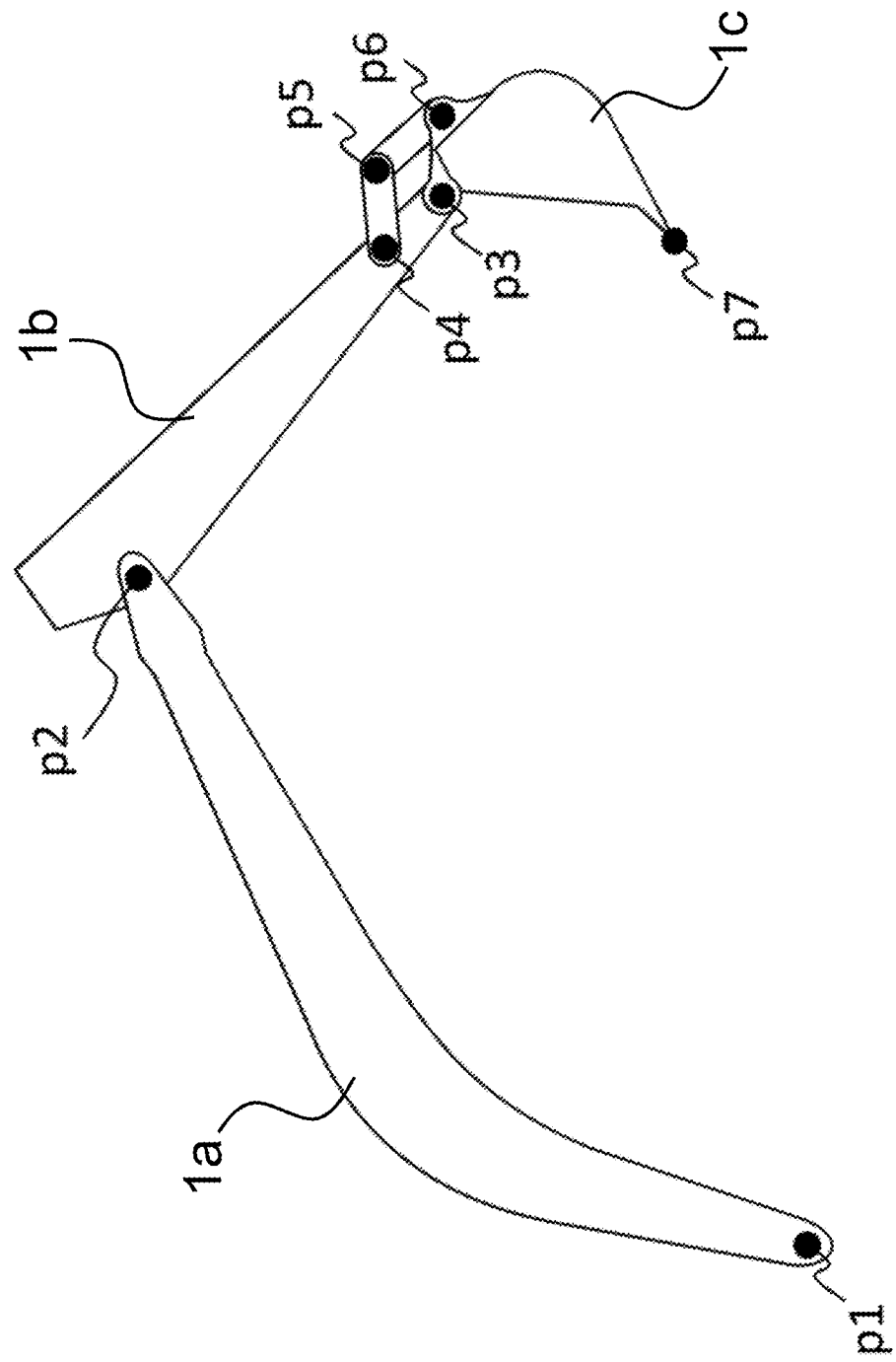
FIG. 13 is a diagram illustrating the positions of markers attached to the respective front members of the front work implement according to the embodiment of the present invention.

In S115, the measurement instruction transmitting section 20b of the controller 20 transmits a measurement instruction signal to the pin position measurement device 20 wirelessly communicably connected to the controller 20, with the acquisition of the measurement instruction from the input device 15 being the trigger. Here, the pin position measurement device 19 is a device that can measure the angle and the distance with high accuracy, such as a total station, and the case in which the pin position measurement device 19 is a total station will be described in the following. As illustrated in FIG. 13, markers for measurement are set in advance on end surfaces in the axial direction in the respective pins p1 to p6 that join the respective front members 1a, 1b, and 1c of the front work implement 1A and the bucket claw tip p7. The total station (pin position measurement device 19) that has received the measurement instruction signal from the controller 20 measures the distance and the angle to each marker. Upon the end of the measurement, the total station (pin position measurement device 19) transmits measurement values thereof (distance and angle to each marker) to the controller 20 and thereby the controller 20 acquires the measurement values of the total station (S116). The configuration and operation of the total station are publicly known and therefore description thereof is omitted here.

In S117, the output signal acquiring section 20d of the controller 20 acquires output signals of the inertial measurement devices S1 to S3.

In S118, the attachment angle computing section 20e of the controller 20 computes the attachment angles of the inertial measurement devices S1 to S3 with respect to the respective front members of the front work implement 1A on the basis of the measurement values of the total station (pin position measurement device 19) acquired in S116 and the output signals of the inertial measurement devices S1 to S3 acquired in S117 (S118), and records it in the calibration data storing section 20f as calibration data (S119).

(Operation and Effects)

In the calibration work support system configured in the above-described manner, when the operator M inputs the machine information (including machine rank data and specification data) and the work information (including work item information and work procedure information (target measurement posture)) to the input device 15, the display controller 17B generates the image (target posture image 24) of the case in which the front work implement 1A that takes the target measurement posture is viewed with the point-of-view position and the line-of-sight direction of the operator M, and projects the target posture image 24 onto the half mirror 17G of the HMD 17. Since the half mirror 17G of the HMD 17 has transmissibility, the target posture image 24 is superimposed on the actual front work implement 1A viewed with the point-of-view position and the line-of-sight direction of the operator M at the time (see FIG. 8). Similarly to the actual front work implement 1A, the target posture image 24 is also the figure of the front work implement 1A viewed with the point-of-view position and the line-of-sight direction of the operator M. Thus, by only operating the operation levers 7a1, 7a1 to make the actual front work implement 1A to operate so as to make the actual respective front members overlap with the respective front members in the target posture image on the half mirror 17G, the operator M can make the front work implement 1A take the target measurement posture necessary for calibration work while being present in the cab 7. That is, it becomes unnecessary for the operator M to get out of the cab 7 and visually check the posture of the front work implement 1A from a lateral side of the hydraulic excavator 1 in the calibration work of the inertial measurement devices S1, S2, and S3, and the operator M can operate the front work implement 1A into the correct target measurement posture while being present in the cab 7 irrespective of the proficiency level of the operator M. As a result, the procedure of visual check from the outside of the cab 7 becomes unnecessary and the work efficiency of the whole of the calibration work is improved.

(Modification Example)

Next, a modification example of the above-described embodiment will be described. In the above-described embodiment, the example is shown in which the HMD 17 mounted on the head of the operator is used as a display device and the camera 17A of the HMD 17 detects the marker 7b on the windshield 16 to thereby estimate the head posture of the operator M and control displaying of the target posture image 24 on the half mirror 17G.

Figure 14:
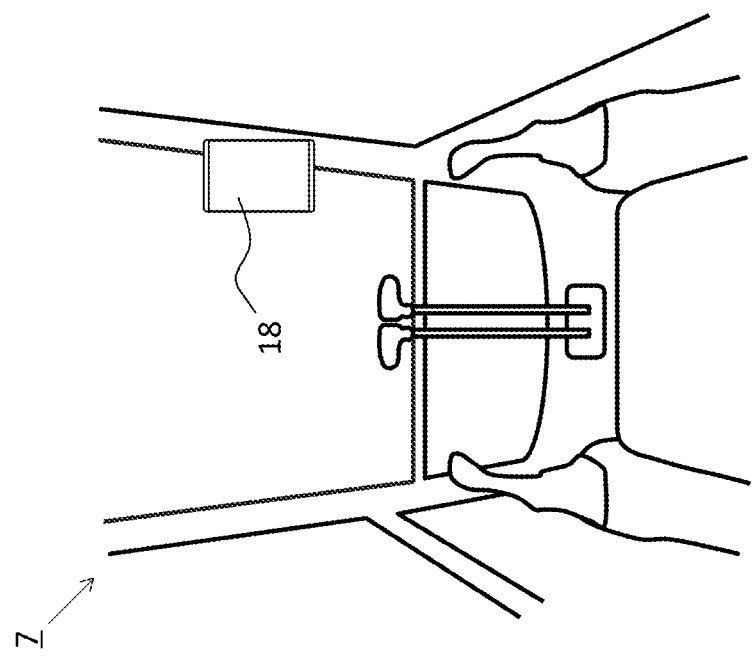
FIG. 14 is a diagram illustrating the attachment position of a display device according to a modification example of the embodiment of the present invention.

As another example, instead of the HMD 17, a general display device (for example, LCD display or organic EL display) that does not have an optical system of lens, half mirror, and so forth may be used. Specifically, as illustrated in FIG. 14, a display device 18 fixed to the right pillar 13 in the cab 7 can be used. The display controller 17B is housed in the casing of the display device 18.

FIG. 15 is a diagram illustrating the front side (left in the diagram) and the back side (right in the diagram) of the display device 18. A camera 18A is disposed on the back side of the display device 18 and this camera 18A photographs the front side of the cab 7 including the front work implement 1A. A target posture image 26 is generated based on the machine information and the work information acquired by the input device 9 as with the above-described embodiment. On the front side (left in the diagram) of the display 18, a photographed image 25 of the front side of the cab photographed by the camera 18A and an image (target posture image) 26 of the case in which model data of the front work implement 1A that takes the target measurement posture is viewed from the attachment position of the camera 18A in the optical axis direction of the camera 18A are displayed, and the target posture image 26 is displayed to be superimposed on the actual front work implement 1A on the photographed image 25. The modification example is the same as the above embodiment regarding the other part and description thereof is omitted.

As described above, in the present modification example, the attachment position and the optical axis direction of the camera 18A attached to the hydraulic excavator 1 (pillar 13) are employed as the position and the direction that serve as the basis when the display controller 17B generates the target posture image 26. The display controller 17B generates an image as the image (target posture image) 26 when the front work implement 1A that takes the target measurement posture is viewed by the camera 18A on the basis of the machine information input from the input device 15, the target posture image (work information), and the attachment position and the optical axis direction of the camera 18A. The display device 18 is a display disposed on the front side of the operator M who sits on a seat in the cab 7 and displays the actual front work implement 1A photographed by the camera 18A and the target posture image 26 in a superimposing manner.

Also when the system is calibrated as above, similarly to the above embodiment, the target posture image 26 can be presented to the operator in such a manner as to overlap with the position of the actual front irrespective of the machine rank and specifications of the machine as the subject of the calibration work. Thus, the operator can easily grasp the difference between the target posture image 26 and the present posture of the front work implement 1A while being present in the cab 7. That is, irrespective of the proficiency level of the operator, the operator can operate the front work implement 1A into the correct measurement posture although being present in the cab 7. As a result, the procedure of visual check from the outside of the cab becomes unnecessary and the work efficiency is improved.

(Others)

The present invention is not limited to the above-described embodiment and various modification examples in such a range as not to depart from the gist thereof are included. For example, the present invention is not limited to what includes all configurations explained in the above-described embodiment and what are obtained by deleting part of the configurations are also included. Furthermore, part of configurations according to a certain embodiment can be added to or substituted for a configuration according to another embodiment.

Furthermore, in the above description, when the target posture images 24 and 26 are generated, the point-of-view position and the line-of-sight direction of the operator M and the attachment position and the optical axis direction of the camera 18A are employed as the basis. However, the target posture image may be generated based on desired point-of-view position and line-of-sight direction as long as they are point-of-view position and line-of-sight direction that allow the actual front work implement 1A and the target posture image to be overlapped with each other with common point-of-view position and line-of-sight direction.

Moreover, regarding the respective configurations relating to controllers included in the above-described embodiment (for example, display controller 17B, input controller 15G, controller 20), functions and execution processing of these respective configurations, and so forth, part or all of them may be implemented by hardware (for example, logic to execute the respective functions is designed with an integrated circuit, or the like). Furthermore, as the configurations relating to the above-described controllers, a program (software) that is read out and executed by a calculating device (for example, CPU) to cause implementation of the respective functions relating to the configurations of these controllers may be employed. Data relating to this program can be stored in semiconductor memory (flash memory, SSD, and so forth), magnetic storing device (hard disk drive and so forth), recording medium (magnetic disc, optical disc, and so forth), and so forth.

Furthermore, in the explanation of the above-described respective embodiments, as control lines and information lines, what are understood as necessary ones for the explanation of these embodiments are shown. However, all control lines and information lines relating to products are not necessarily shown. It may be thought that actually almost all configurations are mutually connected.

DESCRIPTION OF REFERENCE CHARACTERS

1: Hydraulic excavator
1A: Front work implement
1*a*: Boom
1*b*: Arm
1*c*: Bucket
S1 to S3: Posture measurement device
7: Cab
M: Operator
7*b*: Two-dimensional marker
13: Windshield
15: Input device
15A: Display
15*a*: Machine information input section
15*b*: Work information input section
16: Pillar
17: Head-mounted display
17A: Camera
17B: Display controller
17C: Calculating device
17D: Storing device
17E: Projector
17F: Lens
17G: Half mirror
17H: Communication I/F
17*a*: Model selecting section
17*b*: Model coordinate transforming section
17*c*: Target posture image generating section
17*d*: Display control section
17*e*: Marker detecting section
17*f*: Camera posture estimating section
17*g*: Model data storing section
17*h*: Marker data storing section
17*i*: Internal parameter storing section
17*j*: Marker position data storing section
18: Display device
18A: Camera
24, 26: Target posture image
25: Front view image

The invention claimed is:

1. A calibration work support system that supports calibration work of an inertial measurement device attached to a work device included in a work machine, the calibration work support system comprising:
    an input device for inputting machine information including machine rank data on the work machine and specification data on the work device,
    a controller configured to generate a target posture image that is an image of a case in which the work device that takes target measurement posture is viewed from a predetermined point-of-view position in a predetermined line-of-sight direction on a basis of the machine information input from the input device and target posture data defined in advance as the target measurement posture of the work device when the inertial measurement device is calibrated, and
    a display device that displays the target posture image generated in the controller, wherein
    the display device is configured to be capable of superimposing the target posture image on the work device that is actual and is viewed from the predetermined point-of-view position in the predetermined line-of-sight direction.

2. The calibration work support system according to claim 1, wherein
    the display device is a transmissive display disposed on a front side of an operator who rides on the work machine,
    the predetermined point-of-view position and the predetermined line-of-sight direction are a point-of-view position and a line-of-sight direction of the operator,
    the calibration work support system further includes a measurement device that measures the point-of-view position and the line-of-sight direction of the operator, and
    the controller is configured to generate, as the target posture image, a target posture image when the work device that takes the target measurement posture is viewed with the point-of-view position and the line-of-sight direction of the operator on a basis of the machine information input from the input device, the target posture data, and the point-of-view position and the line-of-sight direction of the operator measured by the measurement device.

3. The calibration work support system according to claim 2, wherein
the display device is a transmissive head-mounted display worn by the operator who rides on the work machine,
the measurement device is a camera mounted on the head-mounted display and is a camera that photographs a two-dimensional marker set on the front side of a cab of the work machine, and
the controller is configured to calculate the point-of-view position and the line-of-sight direction of the operator on a basis of internal parameters of the camera and a shape of the two-dimensional marker on a photographed image by the camera.

4. The calibration work support system according to claim 1, wherein
the predetermined point-of-view position and the predetermined line-of-sight direction are an attachment position and an optical axis direction of a camera attached to the work machine,
the controller is configured to generate, as the target posture image, a target posture image when the work device that takes the target measurement posture is viewed by the camera on a basis of the machine information input from the input device, the target posture data, and the attachment position and the optical axis direction of the camera, and
the display device is a display disposed on a front side of an operator who rides on the work machine and displays the work device that is actual and is photographed by the camera and the target posture image in a superimposing manner.

* * * * *